(12) United States Patent
Bruckner et al.

(10) Patent No.: US 8,072,467 B2
(45) Date of Patent: Dec. 6, 2011

(54) REQUEST-DRIVEN ON-DEMAND PROCESSING

(75) Inventors: Robert M. Bruckner, Redmond, WA (US); Fang Wang, Redmond, WA (US); Christopher A. Hays, Monroe, WA (US); Jason D. Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/669,723

(22) Filed: Jan. 31, 2007

(65) Prior Publication Data

US 2008/0183726 A1 Jul. 31, 2008

(51) Int. Cl.
G09G 5/00 (2006.01)
G06F 7/00 (2006.01)
G06F 17/30 (2006.01)

(52) U.S. Cl. ........ 345/619; 707/705; 707/752; 707/754; 707/755; 707/756

(58) Field of Classification Search .................. 345/619; 707/705, 752, 754, 755, 756
See application file for complete search history.

(56) References Cited

U.S. PATENT DOCUMENTS

| | | | |
|---|---|---|---|
| 4,498,150 A | 2/1985 | Gaudet et al. | |
| 4,539,653 A | 9/1985 | Bartlett et al. | |
| 6,061,686 A * | 5/2000 | Gauvin et al. | 707/624 |
| 6,076,087 A * | 6/2000 | Suciu | 1/1 |
| 6,523,027 B1 * | 2/2003 | Underwood | 1/1 |
| 6,556,217 B1 | 4/2003 | Makipaa et al. | |
| 6,633,742 B1 * | 10/2003 | Turner et al. | 434/350 |
| 6,704,742 B1 * | 3/2004 | Huth et al. | 707/802 |
| 6,760,043 B2 | 7/2004 | Markel | |
| 6,789,229 B1 | 9/2004 | Dunietz et al. | |
| 6,820,069 B1 * | 11/2004 | Kogan et al. | 706/46 |
| 6,842,906 B1 * | 1/2005 | Bowman-Amuah | 719/330 |
| 7,024,621 B1 | 4/2006 | Tolpin | |
| 2002/0143742 A1 * | 10/2002 | Nonomura et al. | 707/1 |
| 2003/0067489 A1 | 4/2003 | Candy Wong et al. | |
| 2003/0110191 A1 * | 6/2003 | Handsaker et al. | 707/503 |
| 2003/0212667 A1 * | 11/2003 | Andersch et al. | 707/3 |
| 2003/0225829 A1 | 12/2003 | Pena et al. | |
| 2003/0236917 A1 | 12/2003 | Gibbs et al. | |
| 2004/0068521 A1 * | 4/2004 | Haacke et al. | 707/200 |
| 2004/0158563 A1 * | 8/2004 | Pawlowski et al. | 707/10 |
| 2005/0273701 A1 | 12/2005 | Emerson et al. | |
| 2006/0031760 A1 | 2/2006 | Jacobs | |
| 2006/0074874 A1 * | 4/2006 | Day et al. | 707/3 |

OTHER PUBLICATIONS

Candy Wong, et al. A Single-Authoring Technique for Building Device-Independent Presentations http://www.w3.org/2002/07/DIAT/posn/docomo.pdf. Last accessed Nov. 22, 2006.
Charles Jacobs, et al. Adaptive grid-based document layout, 2003 ACM. http://portal.acm.org/citation.cfm?id=882353&dl=GUIDE&coll=GUIDE. Last accessed Nov. 22, 2006.

* cited by examiner

*Primary Examiner* — Xiao M. Wu
*Assistant Examiner* — David T Welch
(74) *Attorney, Agent, or Firm* — Workman Nydegger

(57) ABSTRACT

A rendering system is provided. The rendering system includes a rendering component that receives a request to view a data set and provide output to drive a display application. A processing engine generates output data for the rendering component, where the output data is suitable to satisfy a present demand to render a subset of the data set.

4 Claims, 10 Drawing Sheets

REQUEST-DRIVEN ON-DEMAND PROCESSING

BACKGROUND

Computational and memory demands on computing systems continue to increase exponentially as technology develops newer and ever more powerful applications. One such area that has seen recent growth relates to requirements that database processing technologies that deal with dimensional aspects such as row and column processing are now being coupled with other models such as traditional object models having a class/inheritance structure. Thus, many systems often have a need to support both relational database models and object based models where there also needs to be methods in place to bridge the gap between these models. Demands to support such systems are often placed on available operating systems where a plurality of applications interact with the operating system but employ the system to interact with other applications. Some discussion on these two differing types of models is now provided before a discussion on memory constraints imposed by some applications employing such models.

Object-oriented programming (OOP) is a programming language model organized around "objects" rather than "actions" and data rather than logic. Historically, a program has been viewed as a logical procedure that takes input data, processes it, and produces output data. The programming challenge was seen as how to write the logic, not how to define the data. Object-oriented programming takes the view that what one really is interested in are the objects to manipulate rather than the logic required to manipulate them. Examples of objects range from human beings (described by name, address, and so forth) to buildings and floors (whose properties can be described and managed) down to the display objects on a computer desktop (such as buttons and scroll bars).

One aspect in OOP is to identify the objects to manipulate and how they relate to each other, an exercise often known as data modeling. When an object has been identified, it can be generalized as a class of objects. Then, define the type of data it contains and any logic sequences that can manipulate it. Each distinct logic sequence is known as a method. A real instance of a class is called an "object" or, in some environments, an "instance of a class." The object or class instance is what executes on the computer. The object's methods provide computer instructions and the class object characteristics provide relevant data. In contrast to object models, relational database models are now described.

Common relational database models are often supported by some type of query language for accessing and managing large amounts of data. Structured Query Language (SQL) is a prevalent database processing language and may be the most popular computer language used to create, modify, retrieve and manipulate data from relational database management systems. The language has evolved beyond its original purpose to support object-relational database management systems. In general, SQL was designed for a specific, limited purpose—querying data contained in a relational database. As such, it is a set-based, declarative computer language rather than an imperative language such as C or BASIC which, being general-purpose, were designed to solve a broader set of problems. Language extensions such as PL/SQL bridge this gap to some extent by adding procedural elements, such as flow-of-control constructs. Another approach is to allow programming language code to be embedded in and interact with the database. For example, Oracle and others include Java in the database, and SQL Server 2005 allows languages to be hosted within the database server process, while PostgreSQL allows functions to be written in a wide variety of languages, including Perl, Tcl, and C.

One area where object models and relational models cooperate is in the context of a rendering system or service. Prior art FIG. 8 shows an example prior art rendering system 800 adapted for an SQL/object model system. In general, the system 800 Fetches data; Groups/Sorts/Filters/ and Aggregates the data; and Calculates Report Item Instances from the data. At each processing step, information from previous steps is read from an Intermediate Format and newly calculated information is saved into the Intermediate Format. As shown, the system 800 includes a Rendering Object Model (ROM) 810 that receives data in a target-independent or intermediate format 820 and outputs the data to a renderer 830 which will render data to a display output at a client machine (not shown). The intermediate format 820 is generated by a processing engine 840 which includes a report item instance calculation component 850, a group/sort/aggregate component 860, and a data fetch component 870. The processing engine 840 receives data from a data store 880, a report snapshot 884, and report definition 890. As shown, a request at 894 drives the processing engine to render data at 830.

In general, the rendering application depicted by the system 800 supports a report processing and rendering engine that retrieves data and processes the entire report snapshot 884 as a whole. Thereby, the system 800 pre-generates all report item instances (such as textbox properties and values) in an output format independent intermediate format at 820, and stores this information in chunks (i.e., streams of data). The chunks are de-serialized later during report rendering into the Rendering Object Model 810.

The ROM 810 is a representation of a report in an output-format independent object model representation. In the system 800, the ROM 810 is an instance object model allowing random access to all instances within a dynamic group collection. For example, a report matrix with 1000 row group instances and 1000 column group instances results in an overall matrix size of 1,000,000 cell instances. While all cells are directly accessible through the ROM, only a few may actually be needed to render a specific page at 830. The random-access flexibility of the ROM 810 comes with a considerable memory and performance cost. Despite very advanced caching strategies in the ROM 810, the overall object model still consumes a significant amount of memory and provides a lot of flexibility to rendering extensions 830 that is often not needed for efficient report pagination and layout rendering.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An on-demand request-driven architecture is provided that facilitates rendering of data while conserving memory requirements and improving processing performance. In contrast to previous architectures, the on-demand architecture computes and presents data on an as-need basis and based upon a present request from a client application as opposed to computing all potentially required data upfront in memory.

For example, a request may be received from a client, where a page of data is requested for display. The request is processed as components or chunks of data by a processing engine, and rendered to the client application per the actual page request of data without computing other pages of a set or report. If another page is requested for viewing, the new request is submitted for processing and calculated by the processing engine at the time of the subsequent request. Since the entire report or data set is not computed up front and stored in memory, memory is conserved since client applications generally only need to view a portion of the greater data set. Processing operations are also conserved since processing steps are mitigated by not performing grouping, sorting and filtering, computing aggregates, laying out pages or retrieving data sets that otherwise may not have been requested by respective client applications in the first place.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An on-demand request-driven architecture is provided for rendering data. In one aspect, a data processing and rendering system is provided. The system includes a rendering component that receives a request to view a data set and provide output to drive at least one display application. A processing engine generates subsets of the data set in response to one or more requests for data received from the rendering component, where the subsets are employed by the rendering component to generate a desired target output format In general, the request causes the processing component to perform a pre-calculation to determine a portion of the data set, where the pre-calculation is scalable according to smaller or larger portions of the data set. The pre-calculation can be stored for use in a subsequent request to view the data set or stored as persisted data chunks and/or group tree chunks. The pre-calculation can be stored as a report item instance cache in another example. Components can be provided to progressively build persisted group tree trunks and to define variables which are to be pre-calculated. The variables can be group variables or report variables, for example.

As used in this application, the terms "component," "request," "engine," "model," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
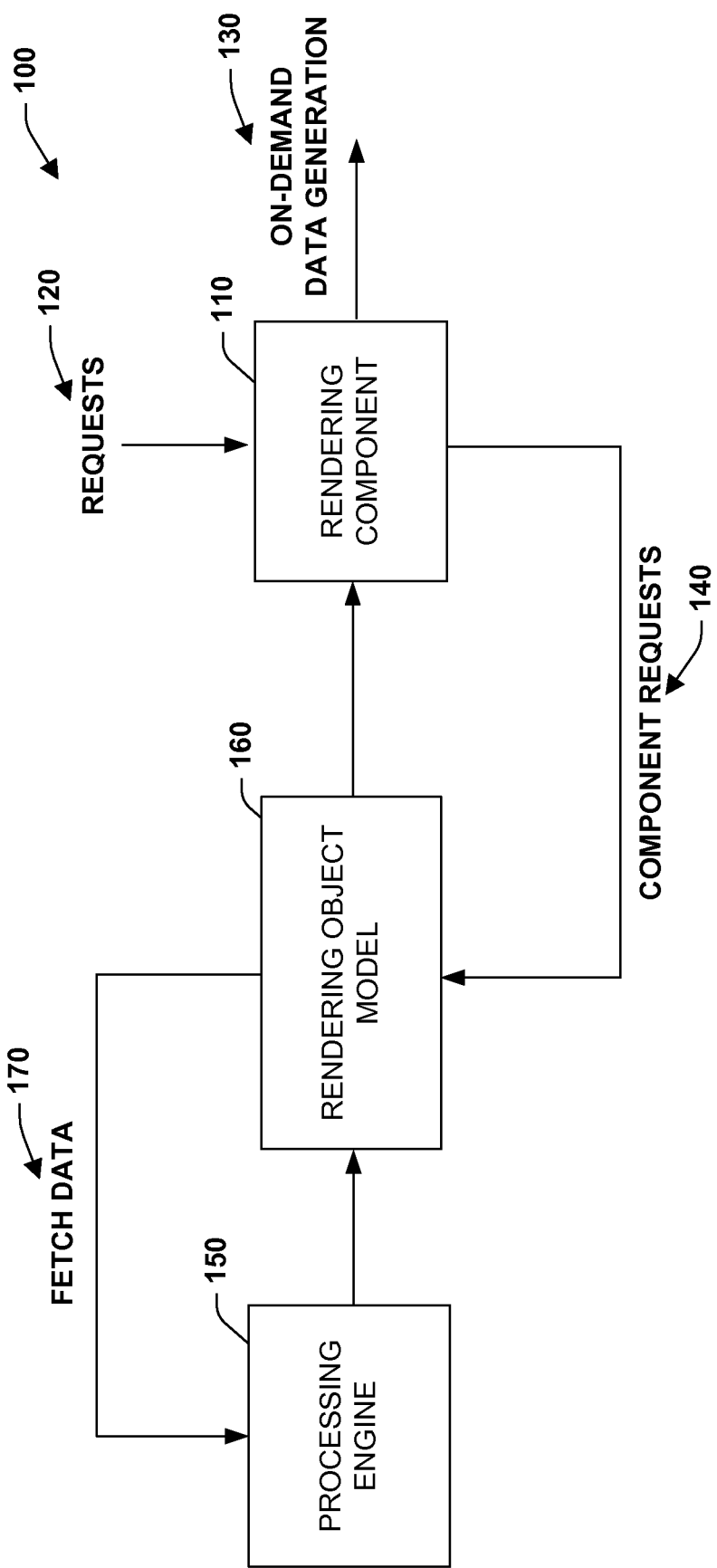
FIG. 1 is a schematic block diagram illustrating an on-demand request-driven rendering system.

Referring initially to FIG. 1, an on-demand request-driven rendering system 100 is illustrated. The system 100 includes a rendering component 110 that receives one or more requests 120 to generate on-demand data 130 for a client application (not shown) to render). For instance the client application may be a display control or application that generates computer display output of data such as a report, document, image, or other format. In general, the system 100 provides an on-demand request-driven architecture that facilitates rendering of data at 130 while conserving memory requirements and improving processing performance. In contrast to previous architectures, the on-demand system 100 computes and presents data at 130 on an as-need basis and based upon a present request 120 from the client application as opposed to computing all potentially required data upfront in memory. For example, the request 120 may be received from a client, where a page of data is requested for display.

The request 120 is processed as components or chunks of data at 140 by a processing engine 150 and rendering object model 160, and rendered to the client application at 130 per the actual page request of data without computing other pages of a set or report. As shown, the request 120 and 140 causes a subsequent fetch of data at 170 to satisfy the given request. If another page is requested for viewing at 120, the new request is submitted for processing and output data is generated by the processing engine 150 at the time of the subsequent request. Since the entire report or data set is not computed up front and stored in memory, memory is conserved since client applications generally only need to view a portion of the greater data set. Processing operations are also conserved since processing steps are mitigated by not computing pages or data sets that otherwise may not have been requested by respective client applications in the first place. It is noted that the request at 120 and the component requests 140 are essentially the same in functionality except that the request 120 may be for a data subset such as a page request, whereas the component requests are the textboxes, numbers, symbols, images, rows, columns, and so forth that satisfy the respective page request.

The system 100 includes processes and algorithms that enable on-demand report processing at the point in time when particular property values are accessed by a rendering extension in the Rendering Object Model (ROM) 160. Furthermore, the evaluation of expressions can be deferred making tradeoffs regarding:

persisted chunks (evaluate once and then store, de-serialize as needed).

cached results in memory (cache values until any of the parent grouping context changes).

re-calculating expression results if accessed multiple times. It is noted that the evaluation of expressions can have a time-dependency by the processing engine 150 (such as =Now) or may have an at-most-once semantics (such as =Code.Increment).

On-demand report processing also includes defining variables which are evaluated at-most-once at a defined point in time and are independent of rendering extensions and when and how often they access certain property values in the ROM 160. One aspect of on-demand report processing is that instances (e.g., textbox properties and values) are no longer processed and stored and later de-serialized, but instead they are calculated on-demand as requested by rendering extensions (e.g., Csv rendering, Xml data rendering) or pagination modules (soft page break pagination module, physical pagination module). Consequently, the on-demand evaluation of expressions is at least partially (and in some cases entirely) driven by the order of which objects are accessed in the ROM 160.

The system 100 supports an overall process wherein deferred and on-demand report processing is performed, thereby allowing the approach of calculating an output format independent ROM 160 on-demand, driven by the consumers of that object model via the requests 120 (rendering extensions, pagination modules) accessing property values. This includes a process of defining report and group variables to enable consistency for time-dependent calculations or at-most-once expression evaluations.

Unlike previous report processing models (See FIG. 8) which evaluate all expressions during the report processing step, on-demand report processing generally only evaluates expressions required to determine the current value of a property accessed in the ROM 160. The ROM 160 exposes a full report definition hierarchy and uses a hierarchical cursor-approach to navigate through the item instances (See FIG. 7 and resulting discussion for hierarchical cursors). As the rendering context is moved to the next instance of a dynamic or detail group, for example, the new context applies to all dependent report items (such as cell contents, member headings). Thus, only if instance objects of the ROM 160 are accessed, they will be calculated on-demand based on the current context.

It is noted that since the on-demand processing of a report is triggered by objects being accessed in the ROM 160, some renderers 110 such as data renderers may not access layout specific instance properties and these expressions may never be evaluated as part of rendering-driven on-demand report processing. This is another advantage compared to other models of fully pre-processing all report item instances. Also, the on-demand report processing components provided by the system 100 are responsible for evaluating expressions which are not already pre-evaluated as part of group tree processing (i.e., data grouping, sorting, filtering). For example, textbox instance values, style expressions, interactivity, actions, and layout expressions. In another aspect, a data rendering system is provided. This includes means for processing a request (processing engine 150) to render a data set according to a present request and means for rendering a portion of the data set in response to the request (rendering component 110). This also includes means for storing (ROM 160) the portion of the data set.

Figure 2:
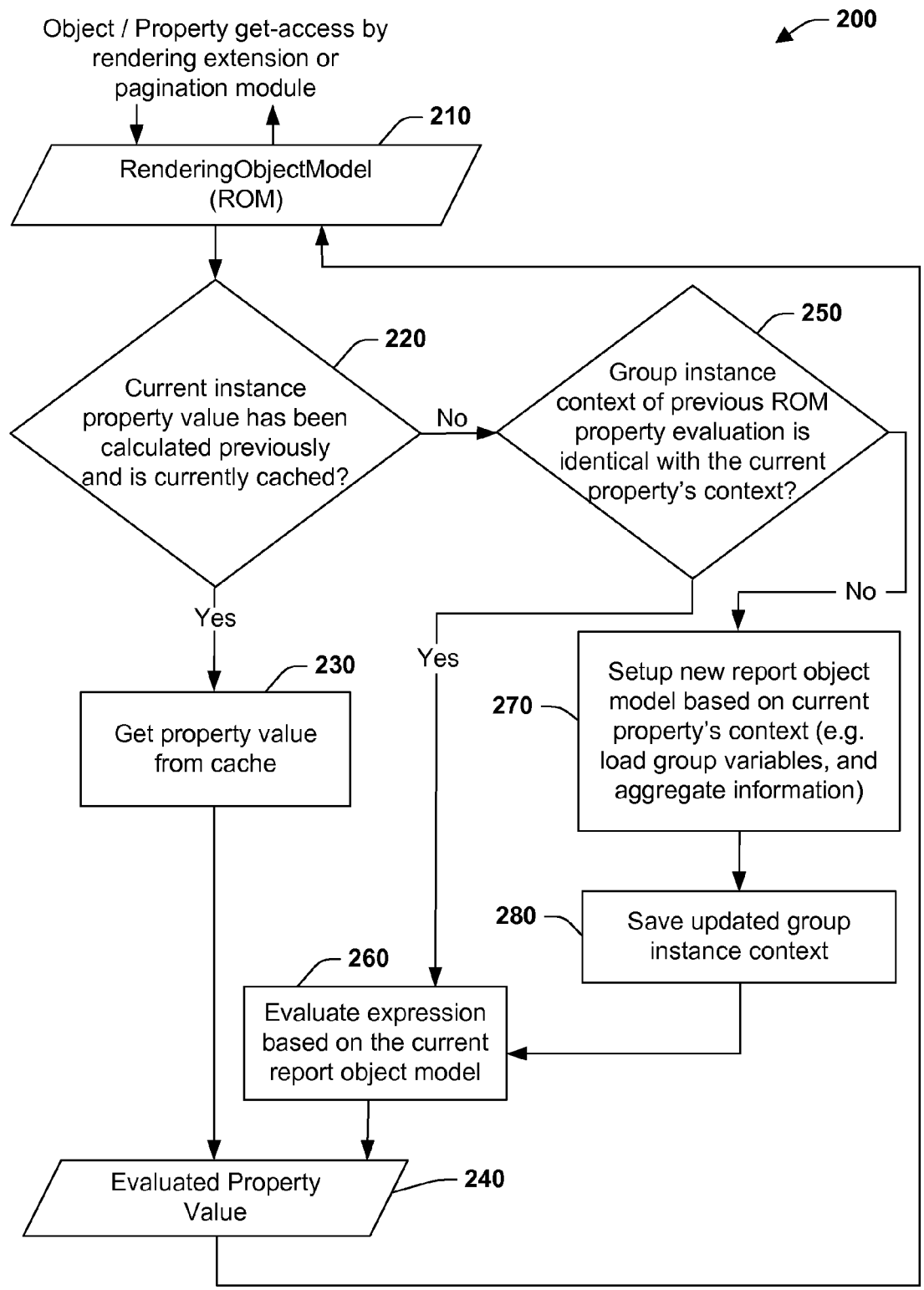
FIG. 2 is a flow diagram that illustrates an example on-demand request-driven process.

Referring now to FIG. 2, an exemplary process 200 illustrates an on-demand reporting process. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

At 210, a Rendering Object Model (ROM) receives input from an Object/Property get-access operation by a rendering extension module or pagination module. At 220, a decision is made as to whether or not a current instance property value has been calculated previously and is currently cached. If the instance has been previously calculated at 220, the process proceeds to 230 and retrieves one or more property values from a cache and supplies act 240 with an evaluated property value from the cache. Output from 240 is returned to 210, where the evaluated property value is supplied to a rendering extension module or pagination module. Referring back to 220, if the current instance property value has not been calculated previously and is not currently cached the process proceeds to 250.

At 250, a decision is made as to whether or not a group instance context of a previous ROM property evaluation is identical (or similar) with the current property's context. If so, the process proceeds to 260 and evaluates an expression based on the current report object model before proceeding back to return evaluated property values from 240. If a group instance context of a previous ROM property evaluation is not identical (or similar) with the current property's context at 250, the process proceeds to 270, where the process sets up a new report object model based on current property's context (e.g., load group variables, and aggregate information). At 280, the process saves an updated group instance context before processing acts 260 and then 240 which were described previously. As can be appreciated, more or less processing acts can be performed by the on-demand concepts described herein.

Figure 3:
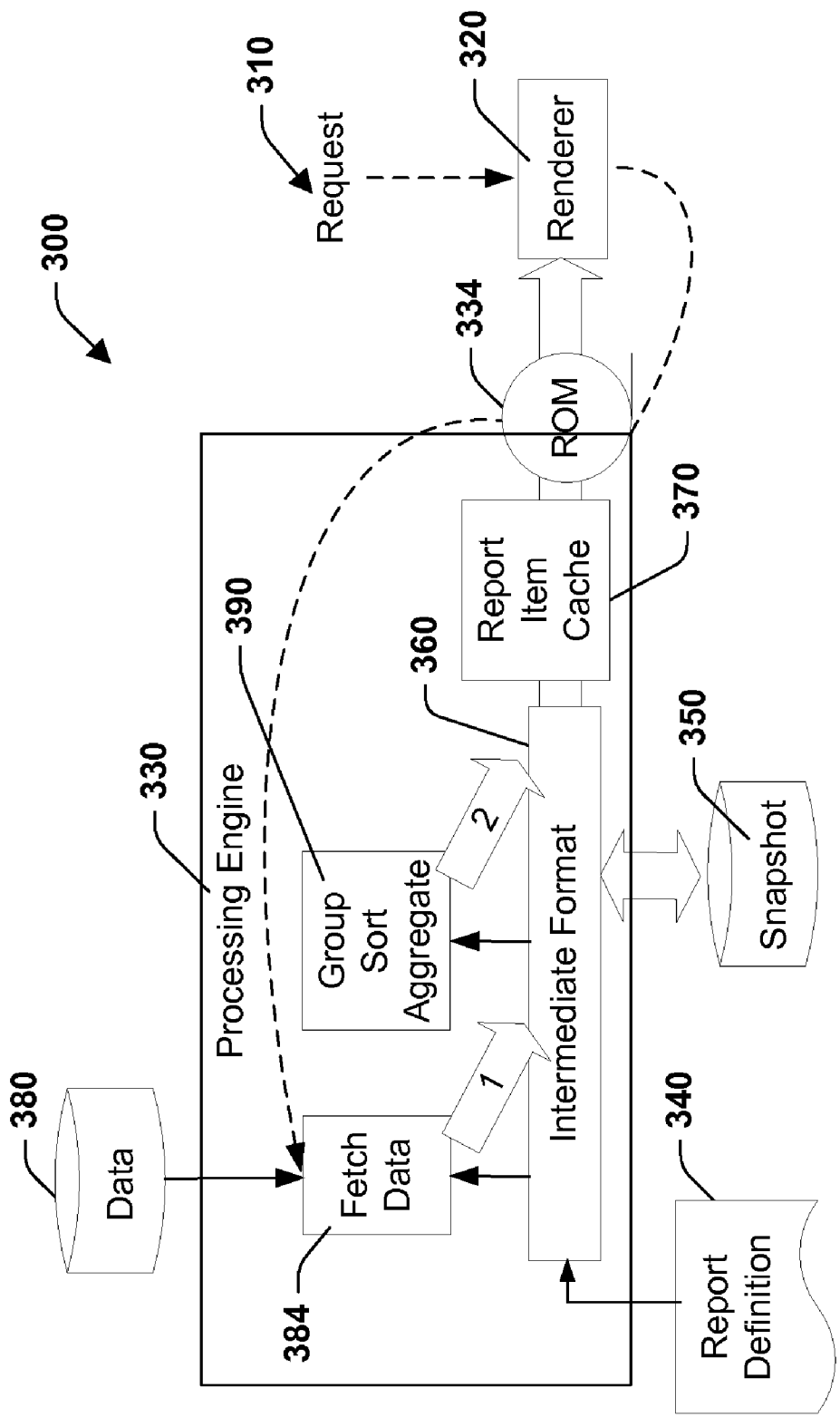
FIG. 3 is an example on-demand rendering system.

Referring now to FIG. 3, an example on-demand rendering system 300 is illustrated. The system 300 shows a simplified view of an example model processing architecture. When a request to execute a report arrives at 310, the request is passed to the specific renderer instead of to a processing engine 330. When the renderer 320 requests data from a Rendering Object Model 334, the processing engine 330 loads the compiled definition and executes queries in the report. As an optional feature the processing engine only executes queries needed to process the currently requested item in the report. The resulting data is grouped, sorted, filtered and aggregated according to a report definition 340, but only for the top-level data region containing the current item being requested by the renderer 320. These results are flushed to a partial snapshot at 350.

Instance calculations such as report item value and style expressions are calculated on the fly as requested by the renderer 320 and are not stored in an intermediate format 360 or snapshot 350. The processing engine 330 does, however, keep a cache of the values at 370 evaluated for the current instance, used to improve performance of intra-instance expression references. This cache 370 can be cleared when a different instance is accessed. Other components in the processing system 300 include a data store 380, a component to fetch data 384, and a group/sort/aggregate component 390.

Figure 7:
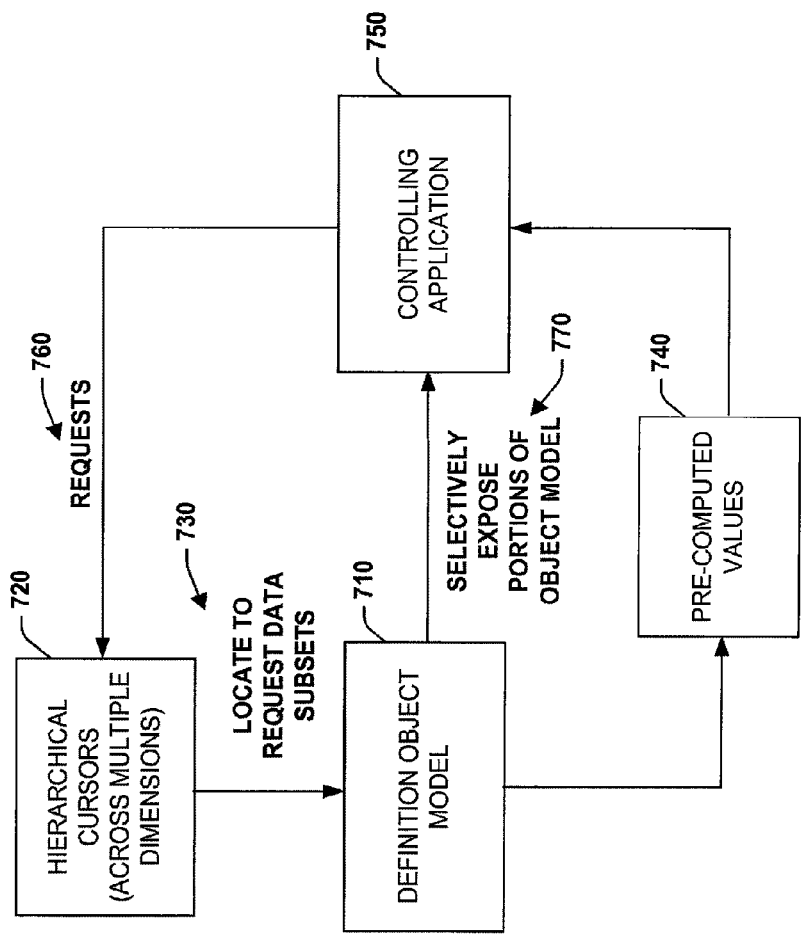
FIG. 7 is an example rendering architecture that employs hierarchical based cursors.
Figure 8:
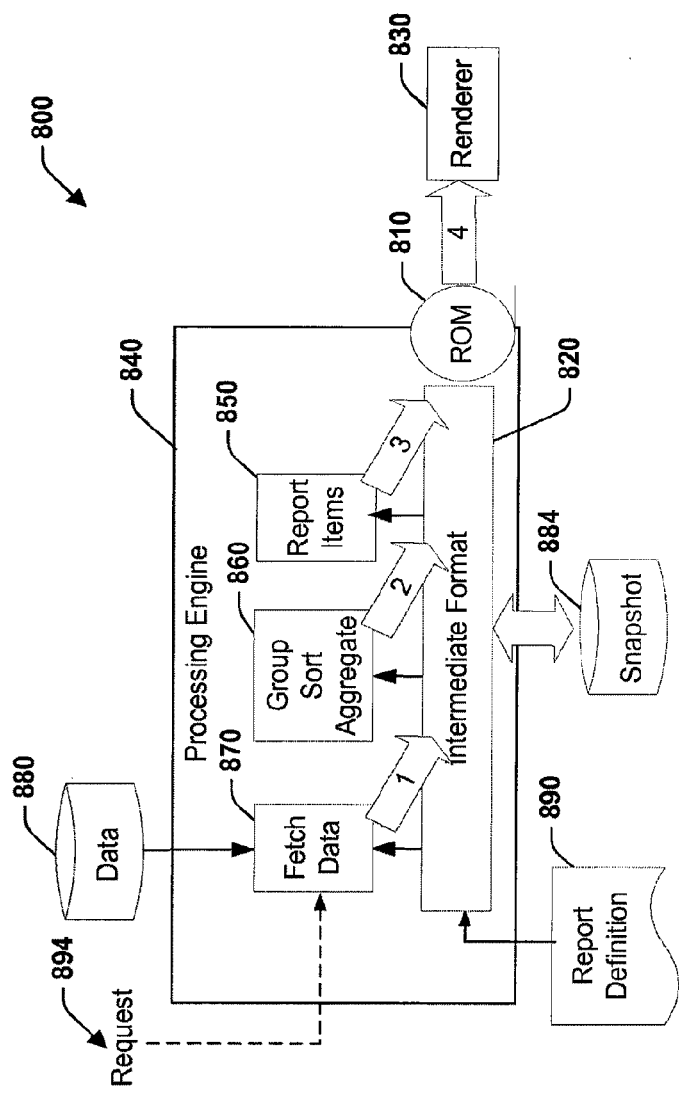
FIG. 8 illustrates an example of a prior art rendering system and object model.

Dynamic object model instance classes (e.g., Text box Instance, Action Instance, Style Instance, and so forth) represent instance information based on the hierarchical cursors moving a sliding window (See discussion for FIG. 7). If a renderer accesses any Get-Property data of an instance class the following (simplified) algorithm can be applied:

```
If the current instance property value has been calculated previously
and is currently cached:
    Return the instance property value from the cache.
    (Note: the instance cache is flushed when any of the parent cursors
    is moved or reset.)
Else /* on-demand processing */
    Compare the current Instance Path (i.e., hierarchical scope instance
    path) with the path used during the evaluation of the previous
    on-demand expression.
    If the paths are identical Then
        Reuse the previous On-Demand Report Object Model.
    Else /* path has changed; runtime environment needs to be prepared */
        Based on the new scope instance path, read information from the
        Group Tree.
        Update the current Report Object Model:
            Update group variables, populate aggregation collection (for
            every changed scope along the path).
            Fetch the data row at the offset stored in the Group Tree
            (representing the first data row of a scope / group instance) and
            populate the fields collection.
        Update the On-Demand Processing Context with the new path.
    End If
    Evaluate the expression with the report runtime (including error
    handling) based on the current Report Object Model. Note: the
    evaluation of a particular expression may implicitly trigger the
    evaluation of dependent expressions (e.g., an expression
    contains a ReportItem reference to another textbox instance).
    Add the expression result to the ROM instance cache.
    Return the instance property value to the renderer.
End If
```

Given the above algorithm, the access pattern of a rendering extension is truly driving on-demand report processing. It also shows that unnecessary cursor context switches and scope path changes (without cursor context switches) can have a negative performance impact because the runtime environment should be setup correctly to enable expression evaluation by calling into an expression host assembly, for example.

In general, on-demand report processing and group tree processing are two different components within a processing engine. However, collaboration of the components is generally utilized to process and render a report. For example:

Group Tree processing is typically responsible for evaluating:
  group/sort/filter expressions (data grouping)
  report and group variables
  simple aggregations, post-sort aggregations, and running values
  calculating the Group Tree
  progressive group tree processing may be triggered by on-demand processing On-demand report processing is typically responsible for:
  evaluating expressions which are not already pre-evaluated by group tree processing. Particularly, textbox instance values, style expressions, interactivity, actions, and layout expressions.
  interacting with chart image rendering (based on the chart data calculations of group tree processing)
  keeping track of the on-demand processing and rendering context
  setting up the on-demand Report Object Model to enable on-demand expression evaluation based on the correct context (which can depend on the Group Tree calculated)
  image evaluation/retrieval/caching if needed On-demand report processing can be driven by a renderer accessing objects in the rendering object model. Generally, the overall size of collections (e.g., total number of cell instances) is not known until the entire group structure has been processed. However, in order to render the first page of a structure with several millions ells, only a subset will be needed and the total count of items in the collection may not be relevant. On-demand report processing attempts to keep the pre-calculated and persisted information rather small to save I/O operations during rendering and evaluate items needed only once or a few times within the report as needed on-demand.

Figure 4:
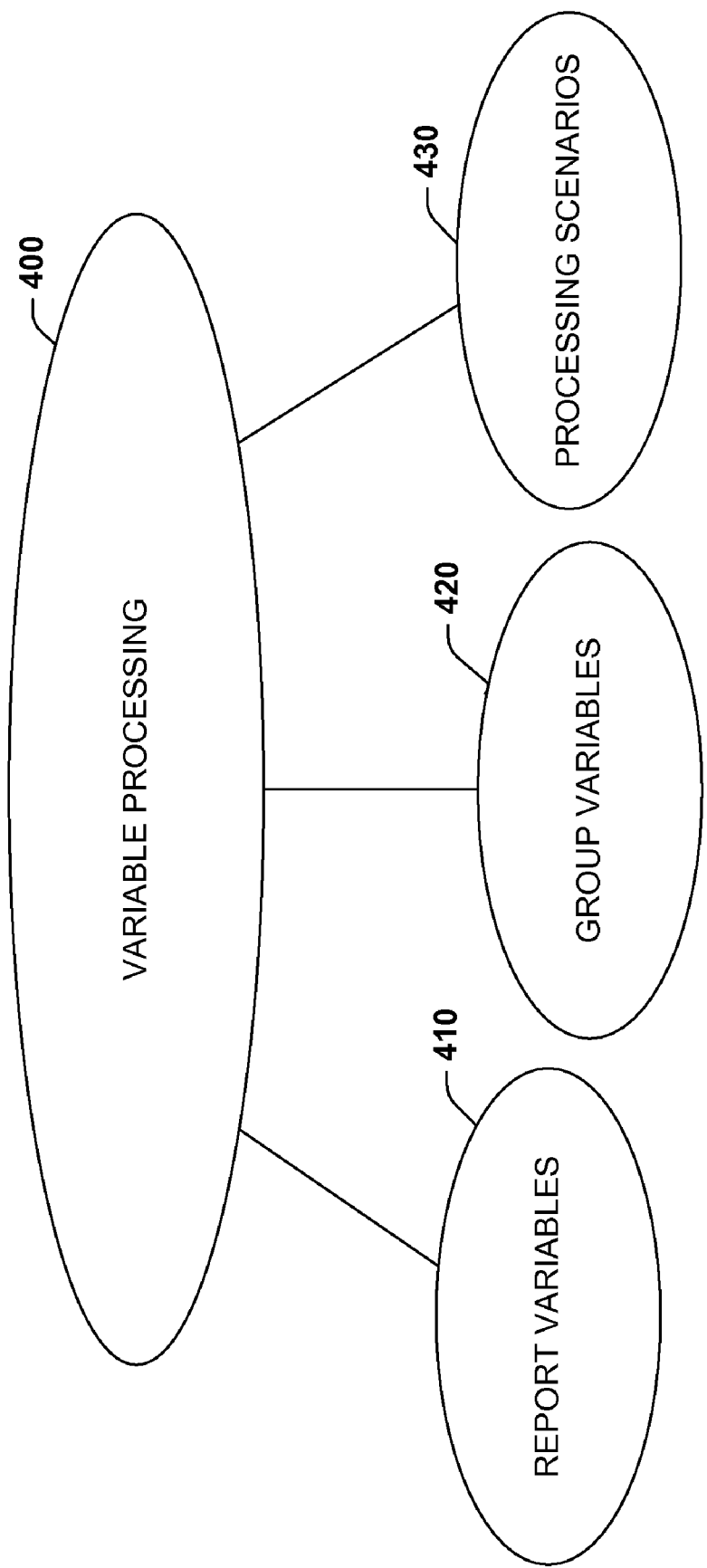
FIG. 4 illustrates variable processing examples for on on-demand rendering systems.

Referring now to FIG. 4, example variable processing 400 is illustrated. Unlike expressions evaluated in visual elements of a report (e.g., text box Value, styles), each variable instance is calculated at most once when the report is executed and generally not recalculated during subsequent renderings within the same session. This facilitates consistency in time-dependent calculations. Generally, there are at least two types of variables. Report variables 410 are visible for report, page header, and page footer expressions. Group variables 420 vary per group instance. They may be calculated with post-sort (or pre-sort) and post-filter semantics of the current group instance. The variable value is generally only visible "within" the grouping scope they are defined on.

In view of on-demand report processing, report and/or group variables enable the following example processing scenarios 430:

Consistency for time-dependent calculations: Expression evaluations with on-demand report processing are mainly driven by the consumers of the ROM (rendering extensions, pagination modules). Thereby the overall time window for on-demand expression evaluations can become much larger than other configurations. On-Demand Report Processing: expressions are evaluated on-demand as needed. On-demand expression results are not persisted (cached within the current instance until any parent grouping context changes).

At-most-once semantics for complex/expensive calculations: Values of report or group variables are persisted when they are evaluated for the first time. Unlike layout expressions, they may not be re-evaluated if used/accessed multiple times.

Ease of use: Commonly used expressions can be defined as a group variable and then referred to as a shortcut in other expressions.

Figure 5:
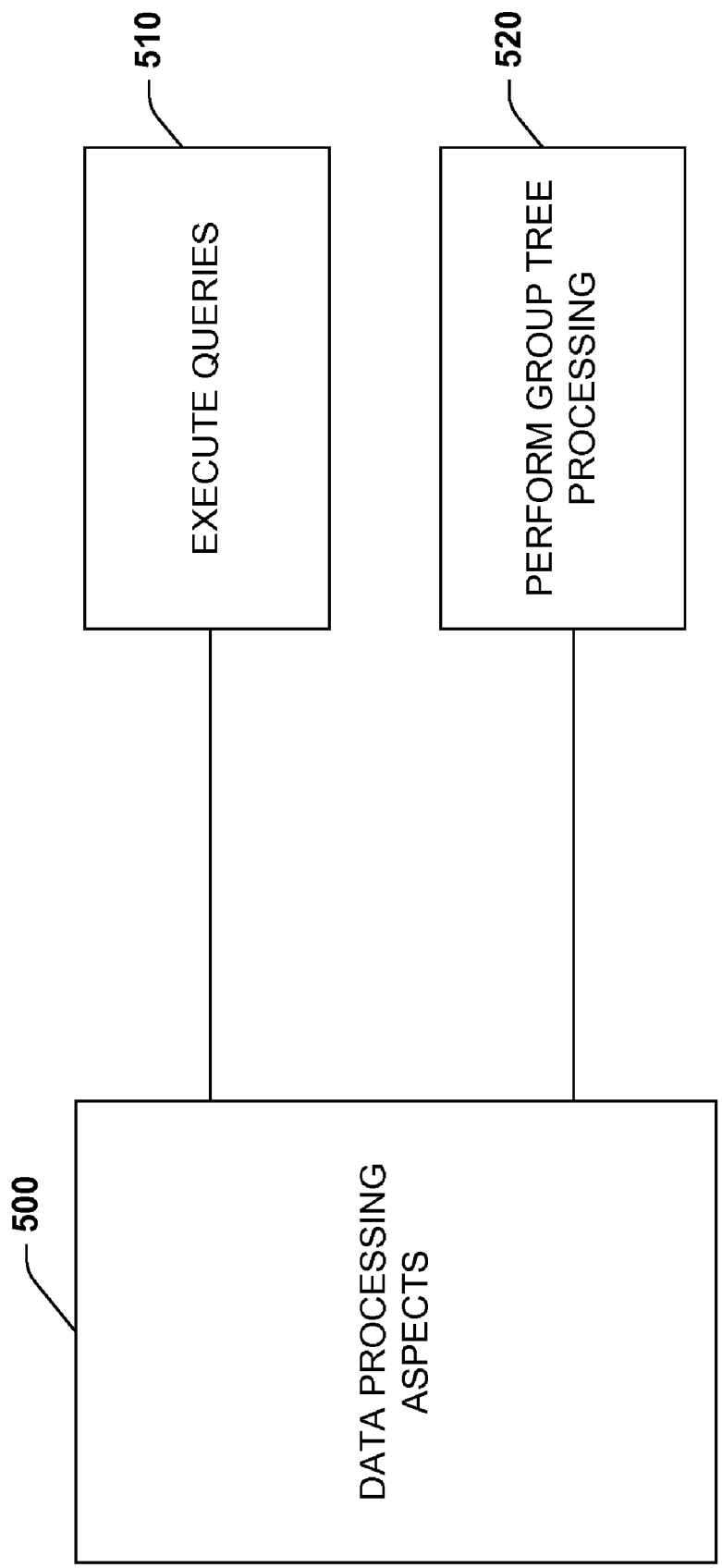
FIG. 5 illustrates data processing aspects for on-demand rendering systems.

Referring to FIG. 5, data processing aspects 500 are illustrated for on-demand rendering systems. Generally, at the beginning of the first request to process and render a report, dataset queries are executed at 510 to facilitate data consistency for the rendering session (unless datasets are marked for report parameter execution only). Queries are executed in parallel, if the data source setting does not require the use of transactions. When data retrieval is complete at 510, on-demand report processing can setup the runtime environment and evaluate report variables described above. At a later time, group tree data processing 520 is performed that can include the following calculations to generate a data region and grouping structure of the report:
  Grouping
  Sorting
  Filtering
  Aggregations (pre-sort, post-sort, Running Value)
  Group Variable calculations
  Recursively process sub-report instances Furthermore, information about report interactivity events is calculated and stored on-demand (such as interactive sort grouping scopes, bookmark and drill through navigation targets, and so forth).

Depending on data characteristics (e.g., "detail" groups, amount of data rows in the dataset, group selectivity), the report layout, and also the ROM consumer (request for one page vs. the entire report), respective grouping information can be calculated as follows:

Fully pre-calculated (depth-first report scope processing approach)

Pre-calculated for the main report, with deferred evaluation for sub-reports in some cases Progressively calculated (breadth-first report scope processing approach) and stored incrementally as (sparse) tree data structures. Additional information can be added progressively on subsequent process/render requests for the report.

The progressive processing approach reduces the initial response time for the rendering the first page of a report by distributing the data processing work over multiple requests. For example, consider a report viewed in HTML with an initial request for page 1 of the report. After some time, the end-user clicks "next" to view page 2, but may never request remaining pages of the report. With the progressive approach, the response times for page 1 and page 2 are quicker and full processing of the report may not need be necessary. This improves overall scalability by better distributing the workload over time, and reducing CPU, memory, and storage consumption.

Figure 6:
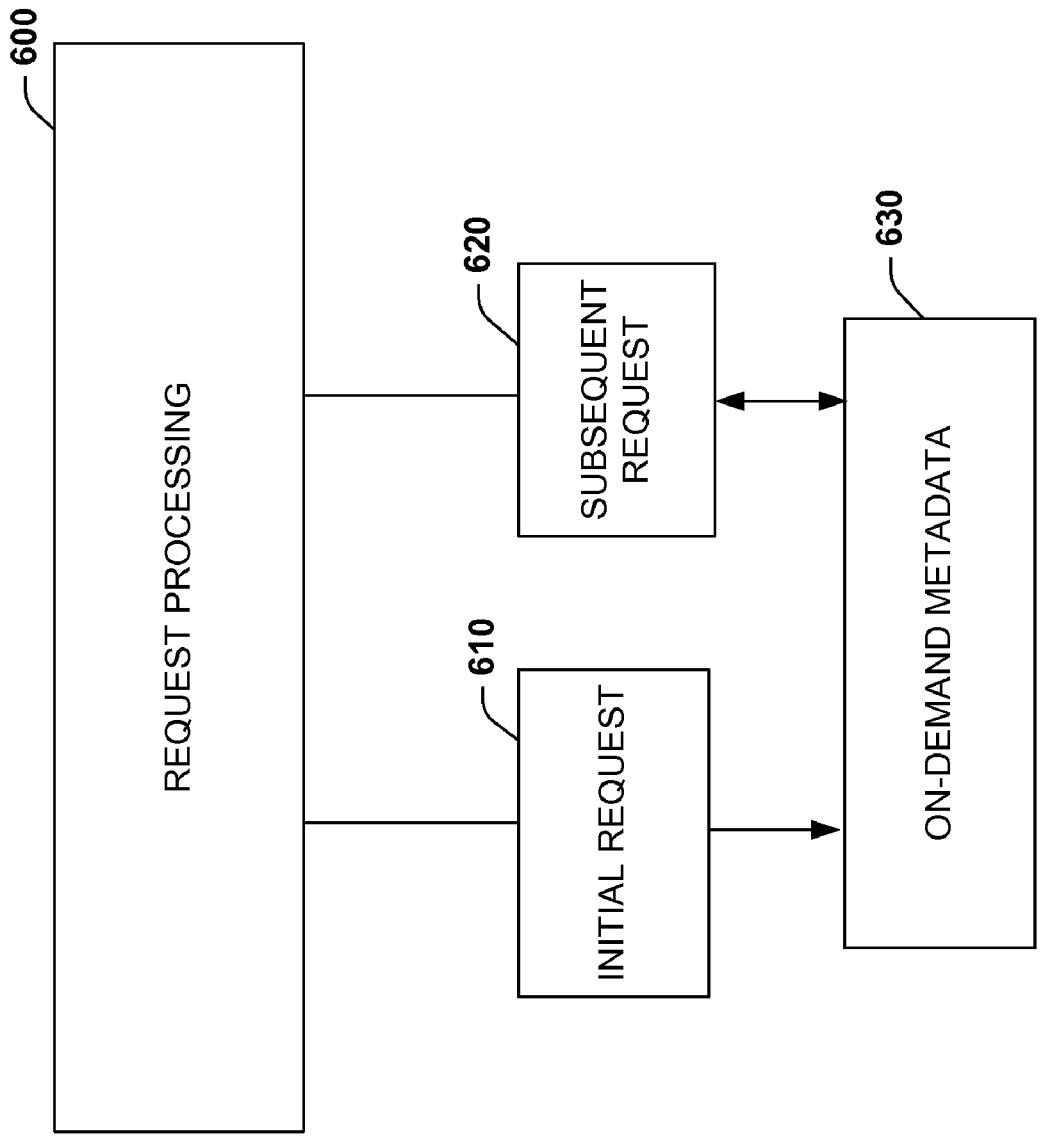
FIG. 6 illustrates request processing aspect for on-demand rendering systems.

Turning to FIG. 6, request processing aspects 600 are illustrated for on-demand rendering systems. At the beginning of an initial request 610 to process and render a report, dataset queries will be executed (unless marked for report parameter execution only). The data can be fetched and written to a data chunk row-by-row. Queries are executed in parallel, if the data source setting does not require the use of transactions. When the data retrieval step has completed, the on-demand processing engine can setup the runtime environment and evaluate report variables. Then, group tree processing can perform the following calculations to populate the Group Tree chunk including Grouping, Sorting, Filtering, Aggregations (pre-sort, post-sort, Running Value), Group Variable calculations, and Recursively process sub-report instances. The Group Tree is generated during the initial processing, or generated progressively for individual scope instances as described above.

At 620 subsequent requests are processed. For example, group tree processing can pre-process a Group Tree before rendering is started and the first page is displayed. Thereby for subsequent rendering requests, the full group tree is already generated and no progressive group tree processing is needed. The subsequent rendering requests 620 can be serviced through the rendering-driven on-demand report processing systems described above. As noted previously, progressive processing can also be applied to process subsequent request 620.

At 630, On-Demand Metadata can be persisted as an overwrite chunk (i.e., on-demand processing de-serializes the contents at the beginning, and serializes the contents at the end of the respective request). Since the metadata is associated with the state of the Group Tree and the state of on-demand processing, the model can be switched to a "chunk header" model. The "chunk header" model binds the on-demand metadata information to the Group Tree chunk to enforce that these two pieces of information stay in sync. Information stored in the on-demand metadata can include a total number of rows in the individual dataset data chunks, a Hash table for external image names fetched during on-demand report processing, and metadata about the Group Tree chunk as well as other metadata if desired.

Referring initially to FIG. 7, an on-demand request-driven rendering system 700 is illustrated. The system 700 includes a definition object model 710 that includes a set of dynamic group definitions (or data structures) over a set of data hierarchies. For example, data nodes acting as parent nodes that supply child nodes underneath the parent nodes form one type of multi-dimensional hierarchy. A hierarchical cursor component 720 (also referred to as a cursor component) locates a subset of a data hierarchy at 730, where the subset can be loaded into memory (not shown) for further processing. In one aspect, one cursor component 720 can be associated with each dynamic group definition in the definition object model 710, where the set of cursor components operate over multiple levels of multiple hierarchical dimensions of the data. In another example, the multiple hierarchical dimensions can be associated with row and column dimensions of a database. As shown, a plurality of pre-computed data values 740 can be computed from the definition object model 710, yet only of a portion of the values may be loaded in memory for further processing as controlled by the respective cursor components 720. It is noted that data as used herein (via a definition object model) has multiple dimensions. Generally, each of those dimensions has one hierarchy, where the respective hierarchy has multiple levels (each level is defined via a dynamic group), where the respective level is associated with a single cursor.

A controlling application 750 generates a request for a next data subset from the data hierarchy at 760. For example, the locations or locators at 730 may be initially set to one portion of the data hierarchy and the controlling application 750 can change the location to another subset in the hierarchy via the request 760 for other data. As shown, data portions are selectively exposed at 770 to the controlling application 750 in response to the request. In one example, the controlling application can be a rendering application however it is to be appreciated that any object manipulation that employs dynamic/relative cursor positions and locations to selectively load portions of the definition object model 710 can also be employed.

Generally, the request 760 controls or influences a location of the cursor component 720. It is noted that the cursor component 720 can be changed in accordance with a plurality of techniques including memory pointers and direct memory offsets, for example. Other examples for controlling location 730 include indexes into arrays or linked lists as well as other implementations. Thus, the locations at 730 can be incrementally or relatively changed from a previous location of the cursor component 720. In another aspect, the locations 730 can be changed over a block or range of memory addresses from a previous location of the cursor component 720. If desired, the user can be presented options that control the amount of data that is loaded upon a given request 760 thus allowing the user to control the trade-off between data that is presently available for processing (higher memory requirement) versus incrementally locating the next data subset upon request 760 (higher processing requirement.

The definition object model 710 and cursor component 720 conserves memory over traditional models in favor of a controlled presentation, acquisition and consumption of available data. Hierarchical cursors 720 are provided that act on a given data set presented by the object model 710 in an incremental/relative manner and independently across multiple dimensions as opposed to operating on the entire data set in memory as a whole. The cursor components 720 act as location pointers at 730 across multiple dimensions (e.g., row or column dimensions) in memory that are controlled by a consuming or controlling application 750 of the data set and via the requests 760. Based on where the cursors point at 730, a reduced subset of memory is loaded and exposed at 770 as the next set of data to be consumed by the controlling application 750. For instance, an initial subset of data may be pointed to by the cursors at 730, where the subset of data pointed to is loaded into memory for further processing.

The controlling application 750 may then request the next subset of data at 760 for processing at any given level of a data hierarchy which effectively changes the address of the cursors at 730 and determines the next subset of data to be loaded. In effect, the next loading of a data subset is relative to the previous location of the cursors. By operating on datasets in an incremental/relative manner in contrast to the entire data set in absolute terms, memory requirements can be reduced and processing performance enhanced since less data is processed via the subset. It is to be appreciated that the definition object model 710 and cursor components 720 can support multiple applications where hierarchical data arrangements are employed (e.g., nodes and leaves of the nodes, relational database columns and rows, and so forth).

Figure 9:
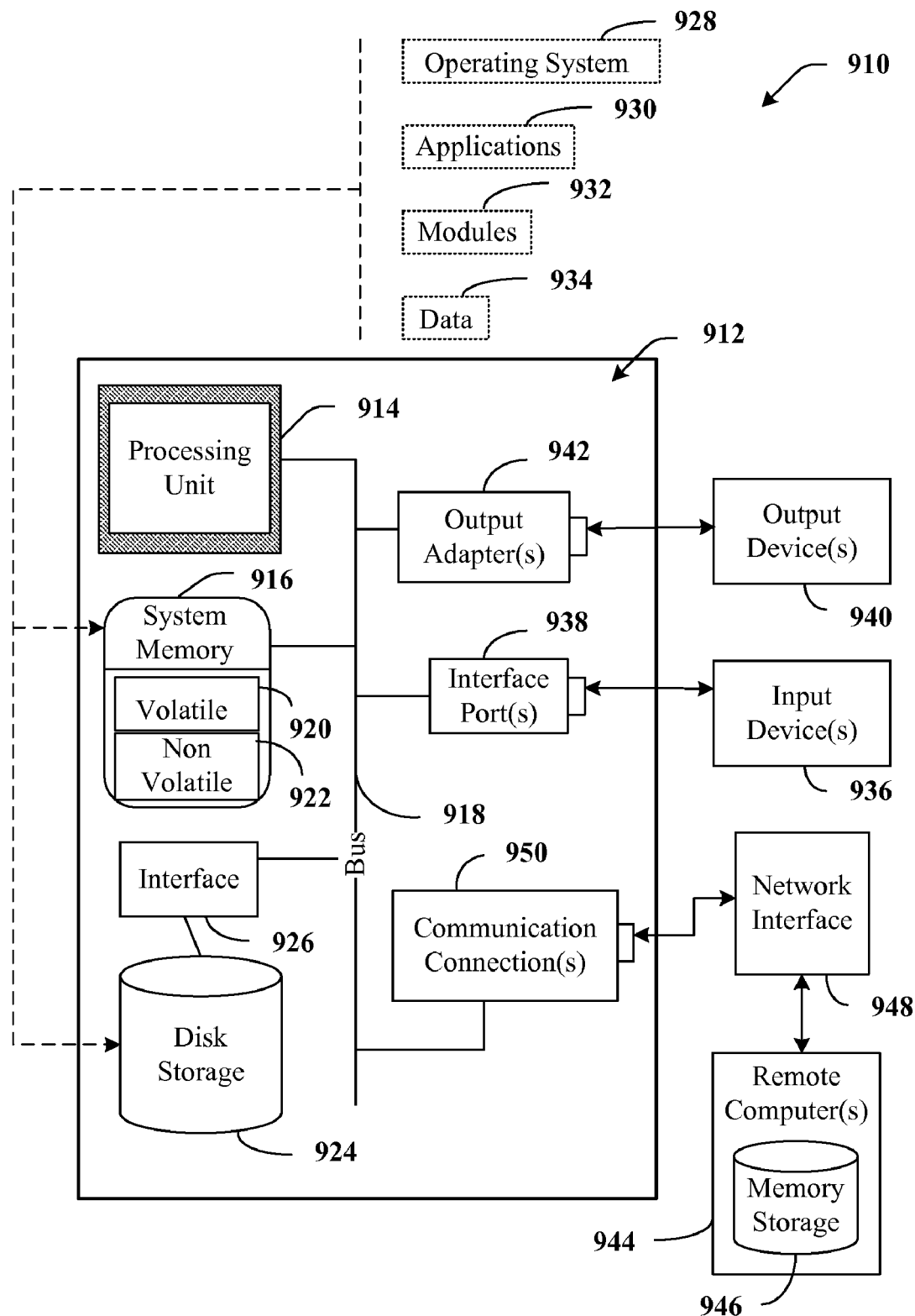
FIG. 9 is a schematic block diagram illustrating a suitable operating environment.
Figure 10:
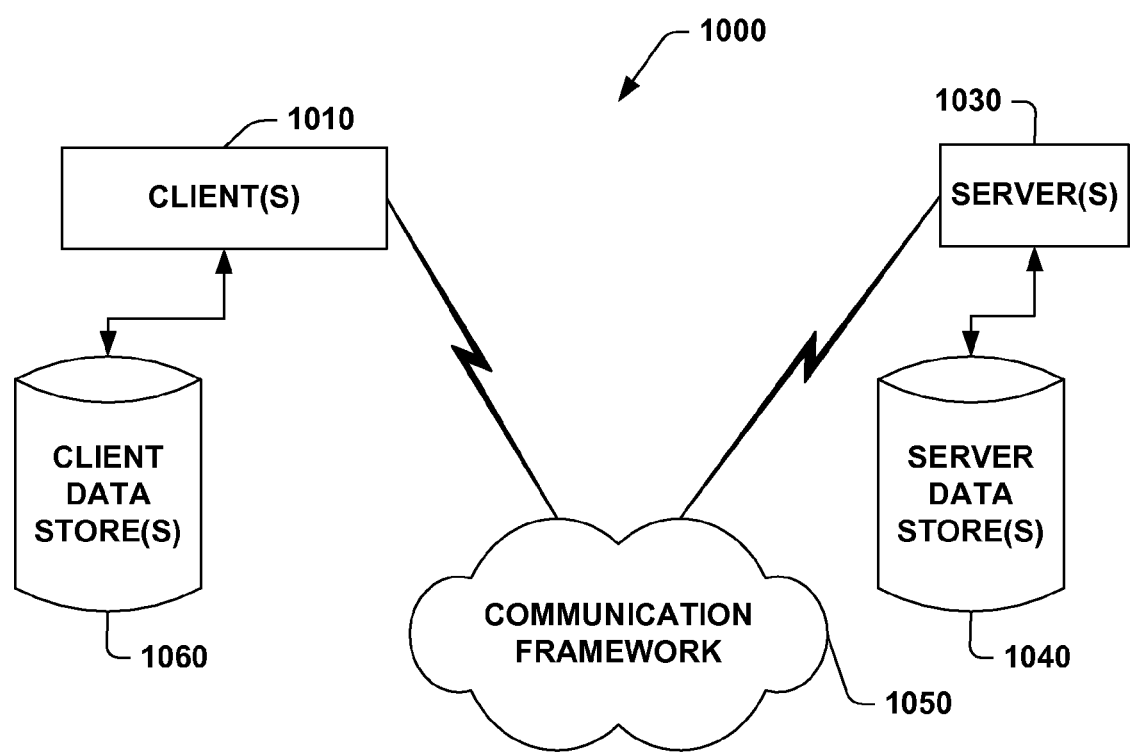
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to render data on demand to reduce memory requirements and increase rendering performance, the method performed upon one or more computer processors, the method comprising:
   receiving a rendering request from a remote application, the rendering request comprising a request to provide output to drive a display of the remote application;
   determining a data subset from a larger data set in response to the rendering request;
   determining whether a current instance of a property value has previously been calculated and is currently cached;
   when the current instance of the property value has previously been calculated and is cached, retrieving the property value;
   when the current instance of the property value is not cached, evaluating an expression to determine the property value;
   comparing a current instance path associated with the rendering request with a previous instance path used during evaluation of a previous on-demand request;
   when the current instance path is identical to the previous instance path, reusing a previous report model;
   providing the property value to a rendering and pagination module for rendering and pagination according to the previous report model; and
   outputting the data subset to the remote application.

2. The method of claim 1, further comprising performing progressive calculations for subsequent requests.

3. The method of claim 2, further comprising incrementally storing tree data structures.

4. The method of claim 3, further comprising adding information to the tree data structures upon subsequent requests.

* * * * *